(12) United States Patent
Cattaneo

(10) Patent No.: US 11,503,911 B2
(45) Date of Patent: Nov. 22, 2022

(54) JOINING SYSTEM WITH LEVELLER FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

( * ) Notice: Subject to any disclaimer, the term of this patent is extended or adjusted under 35 U.S.C. 154(b) by 987 days.

(21) Appl. No.: 16/309,099

(22) PCT Filed: Jun. 29, 2017

(86) PCT No.: PCT/EP2017/066171
§ 371 (c)(1),
(2) Date: Dec. 11, 2018

(87) PCT Pub. No.: WO2018/007237
PCT Pub. Date: Jan. 11, 2018

(65) Prior Publication Data
US 2019/0116976 A1    Apr. 25, 2019

(30) Foreign Application Priority Data

Jul. 7, 2016 (IT) .......................... 102016000070881

(51) Int. Cl.
*A47B 91/02* (2006.01)
*F16B 12/44* (2006.01)
*F16M 7/00* (2006.01)

(52) U.S. Cl.
CPC ............ *A47B 91/024* (2013.01); *A47B 91/02* (2013.01); *F16B 12/44* (2013.01); *F16B 2012/446* (2013.01); *F16M 7/00* (2013.01)

(58) Field of Classification Search
CPC ....... A47B 91/024; A47B 91/02; A47B 91/16; A47B 91/022; A47B 2230/12;
(Continued)

(56) References Cited

U.S. PATENT DOCUMENTS 4,991,805 A * 2/1991 Solak ...................... F25D 23/00
248/188.4
8,220,760 B2 * 7/2012 Fetzer ................... D06F 39/125
248/188.4

(Continued)

FOREIGN PATENT DOCUMENTS

AU    2009227484    *  5/2010
DE    4138112          5/1993
(Continued)

*Primary Examiner* — Janet M Wilkens
(74) *Attorney, Agent, or Firm* — Themis Law

(57) ABSTRACT

A joining system with a leveller for parts of furniture and furnishing items with a bottom (12) and shoulders (11) of the type comprising, in combination: at least one unit with a front foot (14) and at least one unit with a rear foot (15), wherein each front- and rear-foot unit (14, 15) comprises a connection group (GC) and a blocking group (GB) and a levelling group (GL) that can be maneuvered by means of tools, wherein the connection group (GC) and blocking group (GB) of the front- and rear-foot units (14, 15) can be actuated from the front with respect to the piece of furniture through the space between the bottom (12) and the floor, where as the levelling group (GL) of each front- and rear-foot unit (14, 15) can be maneuvered by means of a tool (35) that can be inserted in a small hole (34) formed in the bottom (12) above, and aligned with each front foot and rear foot (14, 15).

12 Claims, 10 Drawing Sheets

(58) Field of Classification Search
CPC .............. F16B 12/44; F16B 2012/446; F16B 12/2063; F16B 12/18; F16B 2012/2045; F16B 2012/2072; F16B 2012/2081; F16M 7/00; F16M 11/24; F16M 2200/08; B25B 23/0021; B25B 17/00; B25B 21/002; A47L 15/4253; D06F 39/125; Y10T 403/7096; Y10T 403/73
USPC ........ 403/7; 248/188.2, 188.4, 188.5, 188.9; 312/351.1, 351.3
See application file for complete search history.

(56) References Cited

U.S. PATENT DOCUMENTS

| | | | |
|---|---|---|---|
| 11,219,313 B2 * | 1/2022 | Cattaneo | ............... A47B 91/005 |
| 11,274,689 B2 * | 3/2022 | Cattaneo | ................. F16B 12/46 |
| 2005/0218276 A1 | 10/2005 | Inoue | |
| 2018/0368574 A1 * | 12/2018 | Cattaneo | ............... A47B 91/028 |
| 2019/0003505 A1 * | 1/2019 | Cattaneo | ................. F16B 12/10 |
| 2019/0145449 A1 * | 5/2019 | Cattaneo | ............. F16B 12/2063 403/7 |
| 2019/0281981 A1 * | 9/2019 | Cattaneo | ............... A47B 91/028 |
| 2020/0196755 A1 * | 6/2020 | Cattaneo | ............... A47B 91/005 |
| 2021/0259419 A1 * | 8/2021 | Cattaneo | ............... A47B 91/026 |

FOREIGN PATENT DOCUMENTS

| | | | |
|---|---|---|---|
| EP | 2653068 | * | 10/2013 |
| EP | 3874989 | * | 9/2021 |
| EP | 3874990 | * | 9/2021 |
| JP | 2002085176 | | 3/2002 |
| KR | 20150051011 | * | 5/2015 |
| WO | 9911160 | | 3/1999 |
| WO | 2005115199 | | 12/2005 |
| WO | 2015102276 | | 7/2015 |
| WO | 2017153175 | * | 9/2017 |
| WO | 2018007252 | * | 1/2018 |
| WO | 2018069248 | * | 4/2018 |
| WO | 2019049003 | * | 3/2019 |
| WO | 2019049008 | * | 3/2019 |
| WO | 2019053564 | * | 3/2019 |
| WO | 2020065521 | * | 4/2020 |
| WO | 2020084434 | * | 4/2020 |

\* cited by examiner

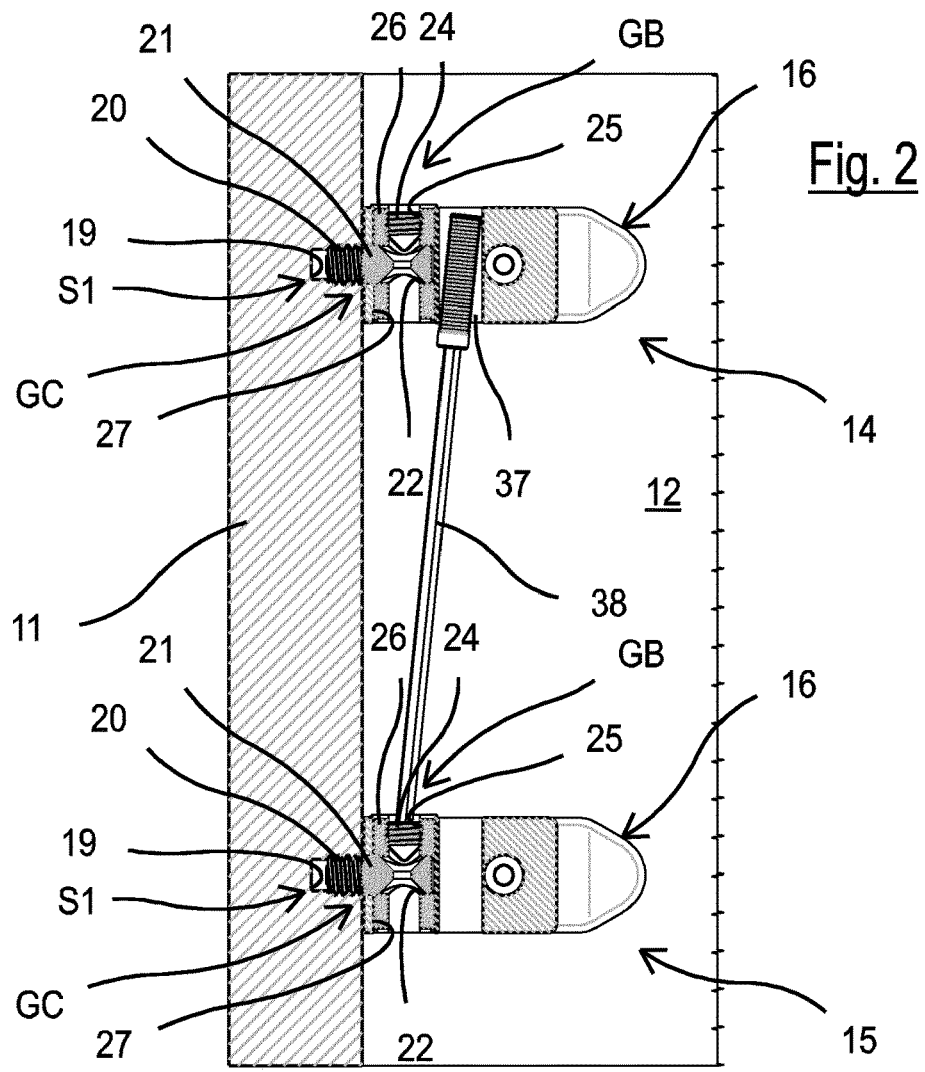
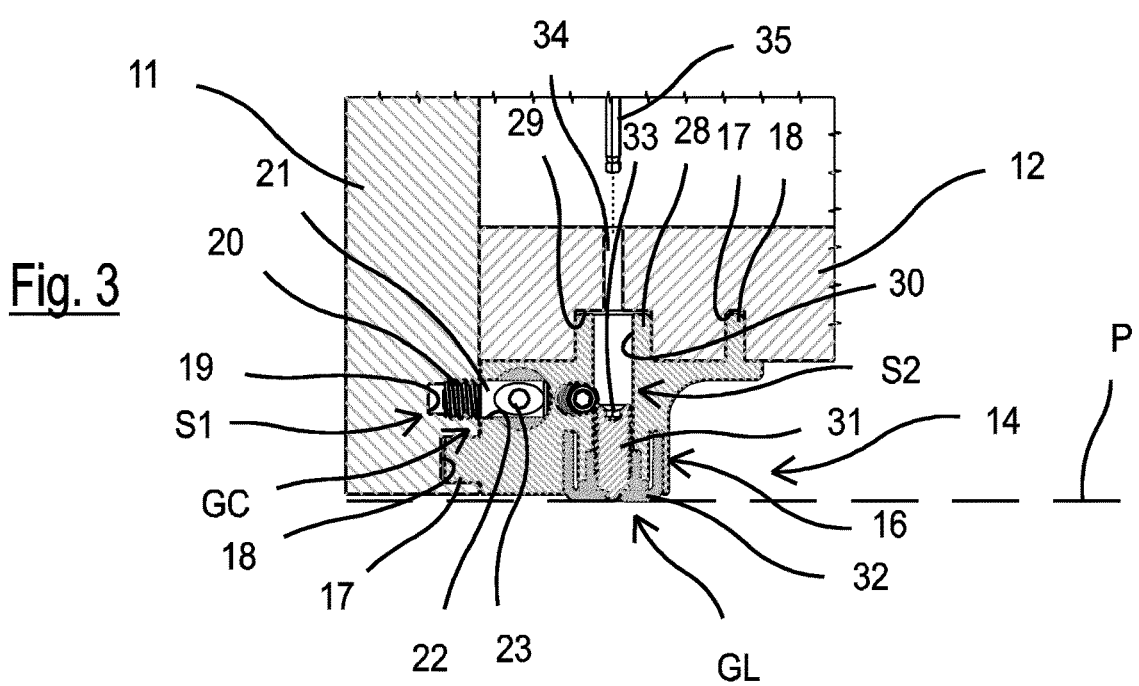

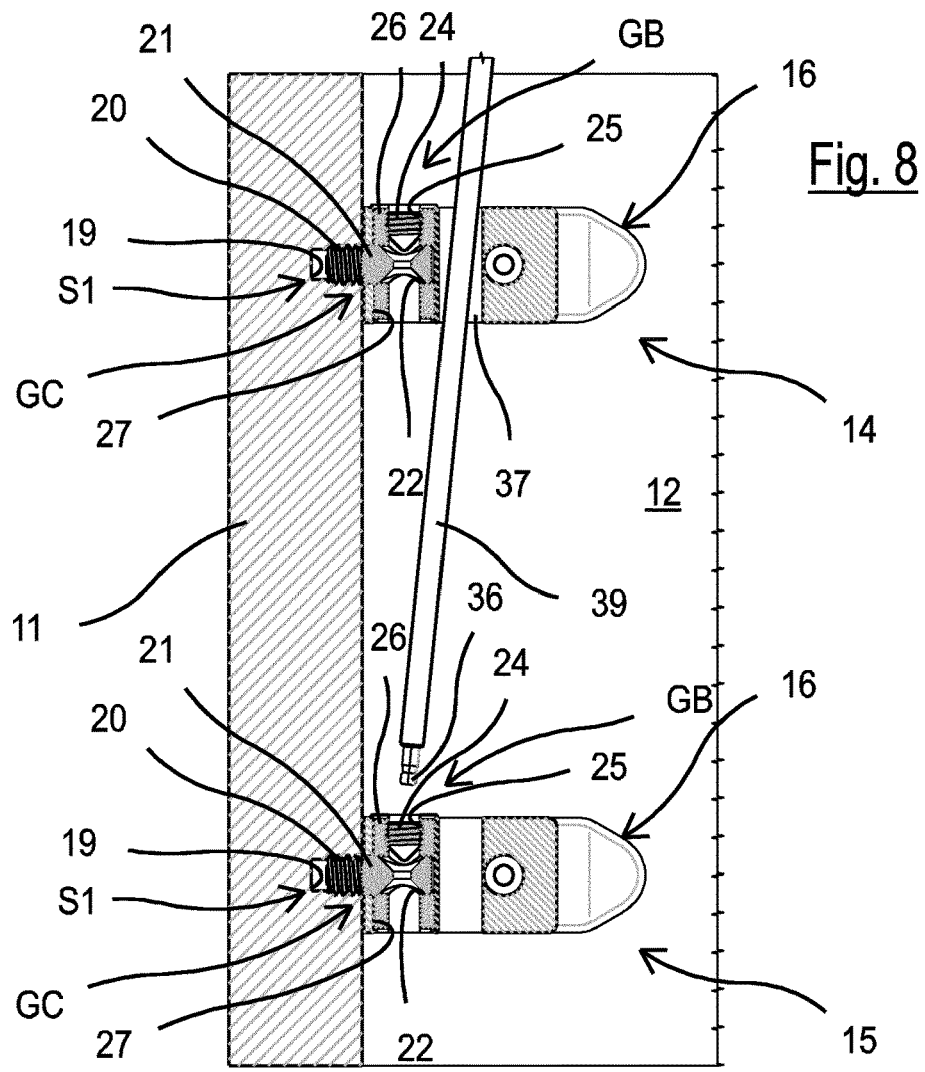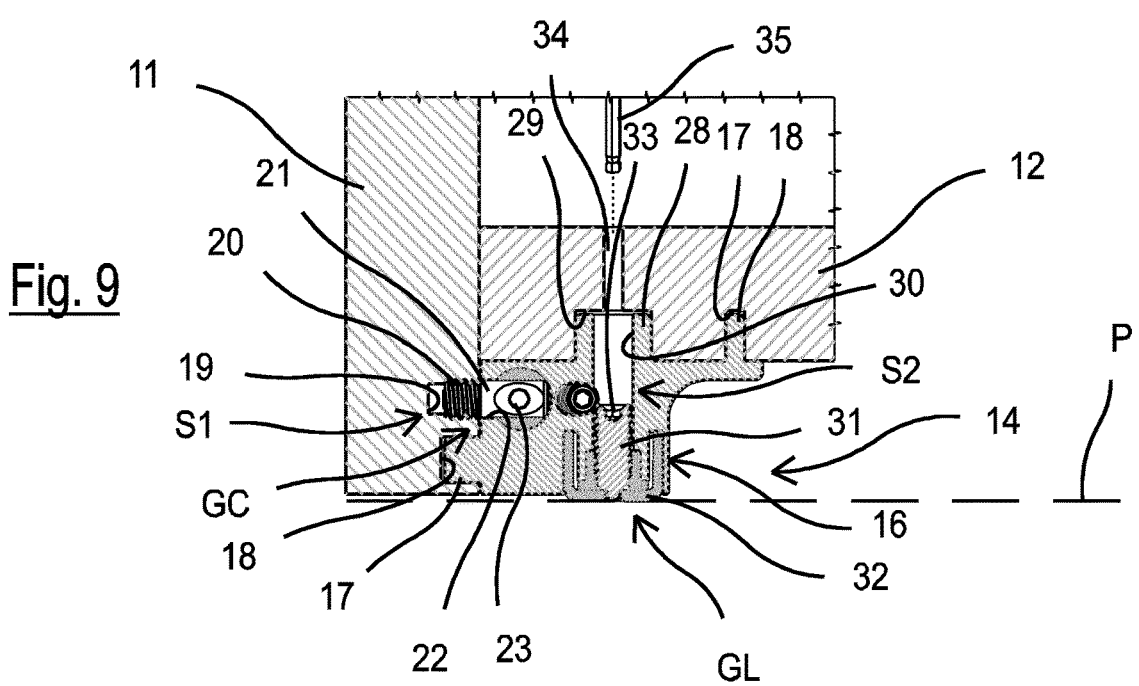

JOINING SYSTEM WITH LEVELLER FOR PARTS OF FURNITURE AND FURNISHING ITEMS

The present invention relates to a joining system with a leveller for parts of furniture and furnishing items.

Various joining and levelling systems for parts of furniture and furnishing items are known, which involve the production of a series of holes, having a certain size, that remain visible.

The known systems provide some space beneath the bottom of the furniture for implementing the junction, which however does not allow easy adjustment of the rear feet and rear joints.

A further known proposal is described and illustrated in Italian patent 1326283 which relates to a device for joining panels of a piece of furniture. The device, moreover, also proposes the possibility of creating a connection with an extensible levelling foot which is thus associated with the joining device. In addition to joining parts of the furniture, there is therefore also an adjustment in height of the furniture by intervening on its supporting feet.

This type of device requires having free space above a base board or panel of the furniture, i.e. above the device, to also allow the adjustment of the supporting foot, with the presence of a large-sized hole. All of this is naturally possible after the joint between shoulders and base and/or shelf of the furniture has been assembled and blocked.

As the device of Italian patent 1326283, therefore requires an actuation of the supporting foot by passing a tool inside the same, it must provide a holing having a certain size, passing through the base or bottom, or shelf of the furniture, to allow access from above. Once this holing has been used for effecting the assembly and adjustment, it must be covered by an equally large cap which is visible to an observer and lowers the aesthetic value of the furniture. Furthermore, the presence of such bulky caps on the base or shelf can be a disturbing element for the positioning of objects that may knock against said cap(s) necessary for the hole(s).

Consequently, in the present art, either separate devices must be used for effecting the joining and levelling, or, if a device such as that indicated in the above-mentioned Italian patent is adopted, visible holings having a certain size must be provided, or in any case that can only be covered with caps that do not allow smooth surfaces free of obstacles or holings.

Finally, if an actuation from above is present, either for joints or levellers, in particular if they are rear, said actuation is not always easy. The spaces available are in fact limited spaces between shelves or minimum distances from the bottom of the furniture or rear wall of the furniture.

The general objective of the present invention is to provide a joining system with a leveller for parts of furniture and furnishing items which solves the problems and drawbacks indicated above.

A further objective of the present invention is to provide a joining system with a leveller for parts of furniture and furnishing items that is particularly simplified and compact with respect to the currently known systems mentioned above.

Another objective of the present invention is to provide a joining system with a leveller for parts of furniture and furnishing items that allows a front connection and adjustment, also for rear joints and leveling feet.

Yet another objective of the present invention is to provide a joining system with a leveller for parts of furniture and furnishing items that is also accessible when said furniture has an extremely limited space beneath the bottom and with serious access difficulties.

A further objective of the invention is to provide a system which is particularly simplified and easy to assemble for the user.

The above objectives are achieved by a system having the characteristics indicated in the enclosed claim 1 and additional subclaims.

The structural and functional characteristics of the invention and its advantages with respect to the known art, of a joining system with a leveller for parts of furniture and furnishing items, can be clearly understood from the following description, referring to the enclosed drawings, that illustrate only some embodiment examples of the invention itself.

In the drawings:

FIGS. 2 and 3 are a plan view from below, partially sectional, of the system of FIG. 1 and a cross-section produced in correspondence with a front supporting foot of FIG. 1, when assembled with respect to the shoulder and bottom;

FIGS. 8 and 9 are a plan view from below, partially sectional, of the system of FIG. 7 and a cross-section produced in correspondence with a front supporting foot of FIG. 7, when assembled with respect to the shoulder and bottom;

With reference in general to the drawings, it can be seen that the figures partially illustrate a piece of furniture M, in which shoulders 11 are provided (of which only one is shown), that may or may not terminate in correspondence with a bottom or base 12, i.e. that may or may not reach the floor, closed at the rear by a lining 13 (see FIGS. 5, 6 and 11, 12).

It should be noted that in this type of furniture, the space beneath the bottom 12 is extremely limited and front access to the adjustable rear feet may be quite difficult due to the limited distance between the floor P and bottom or base 12 of the furniture M.

The bottom 12 is provided with front and rear feet, close to the angles.

Figure 1:
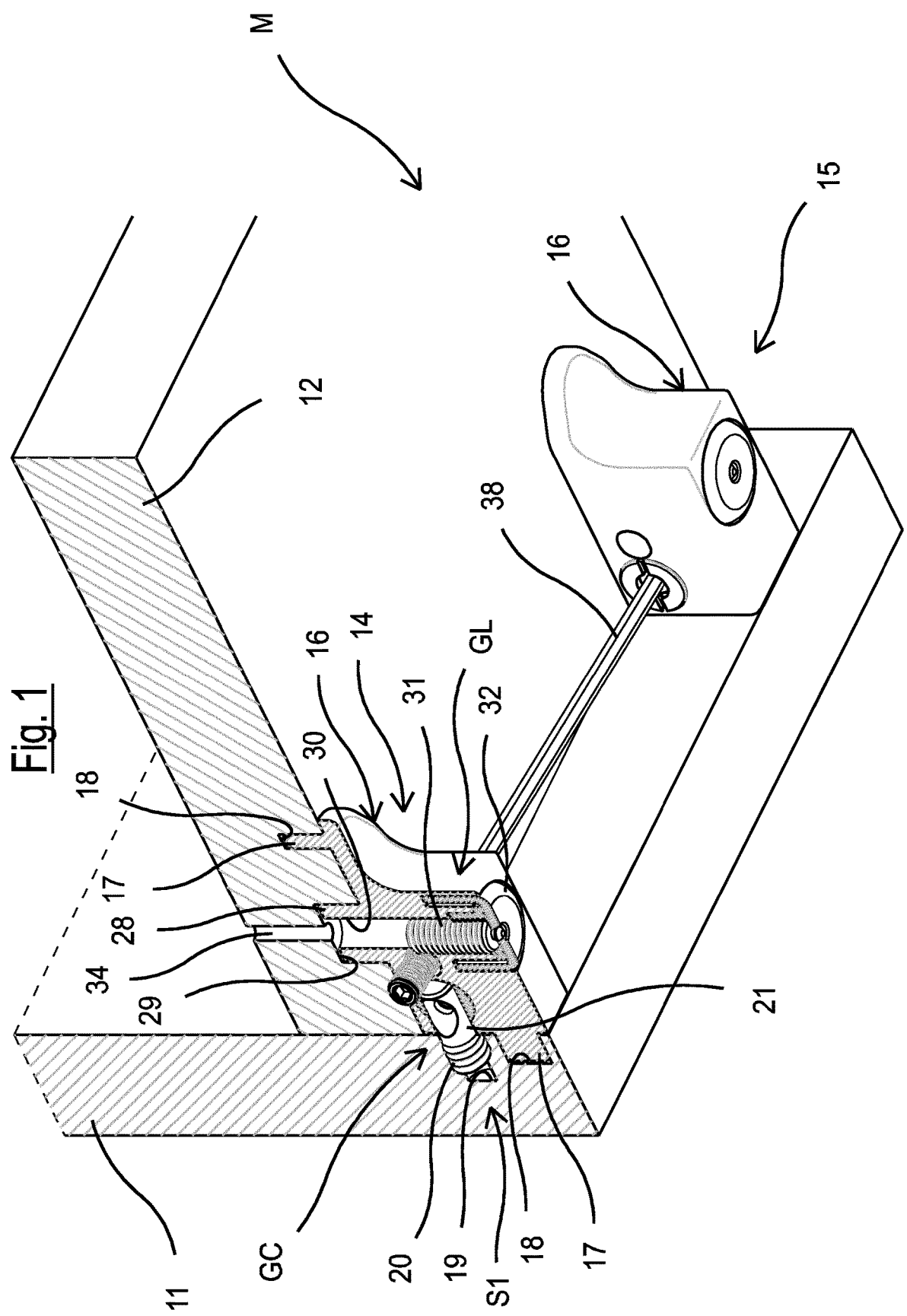
FIG. 1 is a perspective view with cross-sectioned parts that illustrate a first example of a joining system with a leveller for parts of furniture and furnishing items produced according to the present invention positioned for joining a shoulder and a bottom or base of a piece of furniture with a rear foot that can be actuated with a transmission rod.

More specifically, as illustrated in the first embodiment of FIG. 1, a joining system with a leveller for parts suitable for being used in furniture and furnishing items of the invention comprising at last one front-foot unit 14 and a rear-foot unit 15, is fixed to the bottom 12. The above-mentioned units 14 and 15 incorporate joining and levelling devices for parts of furniture and furnishing items.

Primarily, each front-foot unit 14 and rear-foot unit 15 of the joining system with a leveller according to the invention comprises a joining unit of various types.

From FIGS. 1 to 6, it can be seen that each front-foot unit 14 and rear-foot unit 15 of the joining system with a leveller according to the invention comprises a body 16, for example prismatic and shaped, that can be associated by means of interlocking plugs 17 or snap-in or pressure plugs 17 (so-called "duebels") 18 with seats of the bottom 12 and shoulder 11. From the figures, it can also be seen that the shoulder 11 provides a seat S1 in the form of a horizontal blind hole 19 in which a threaded end 20 of a pin 21 is positioned and blocked.

The pin 21 is housed in a horizontal hole 22 formed in the body 16 of the unit 14, 15 and aligned with the hole 19 of the shoulder 11. The pin 21 provides, in its protruding part, a housing 23 for the tip of a blocking grub screw 24. The blocking grub screw 24 is screwed into an inner threaded hole 25, in the example pass-through, of a butt 26 (barrel) housed in a horizontal hole 27 of the body 16, which intersects the hole 22, defining a butt device.

The pin 21 defines a connection group GC to be firmly blocked by means of the grub screw 24 which defines a blocking group GB for firmly connecting the shoulder 11 and the base 12 by actuating the grub screw 24, as can be clearly seen in the figures.

The body 16 also has, in its surface facing the bottom 12, a sleeve extension 28 which is housed in a complementary hollow seat 29 of the bottom 12.

This sleeve extension 28 has a pass-through hole 30, internally threaded and extending for the whole body 16, which defines a seat S2 for a levelling group GL.

The levelling group GL, in the internally threaded pass-through hole 30, receives a threaded screw 31 having a supporting element 32 at its lower end, that collaborates with the floor P. The threaded screw 31 has a recessed hexagonal seat 33, that can be actuated by means of a corresponding tool 35, which causes its rotation and movement inside the threaded hole 30 adjusting the level of the foot of the corresponding furniture. For this purpose, a small pass-through hole 34 is provided in the bottom 12 of the furniture M, which enables the thin tip of the tool 35 to be inserted from the upper end to the bottom, actuating and adjusting the threaded screw 31, and consequently the supporting element 32.

Figure 4:
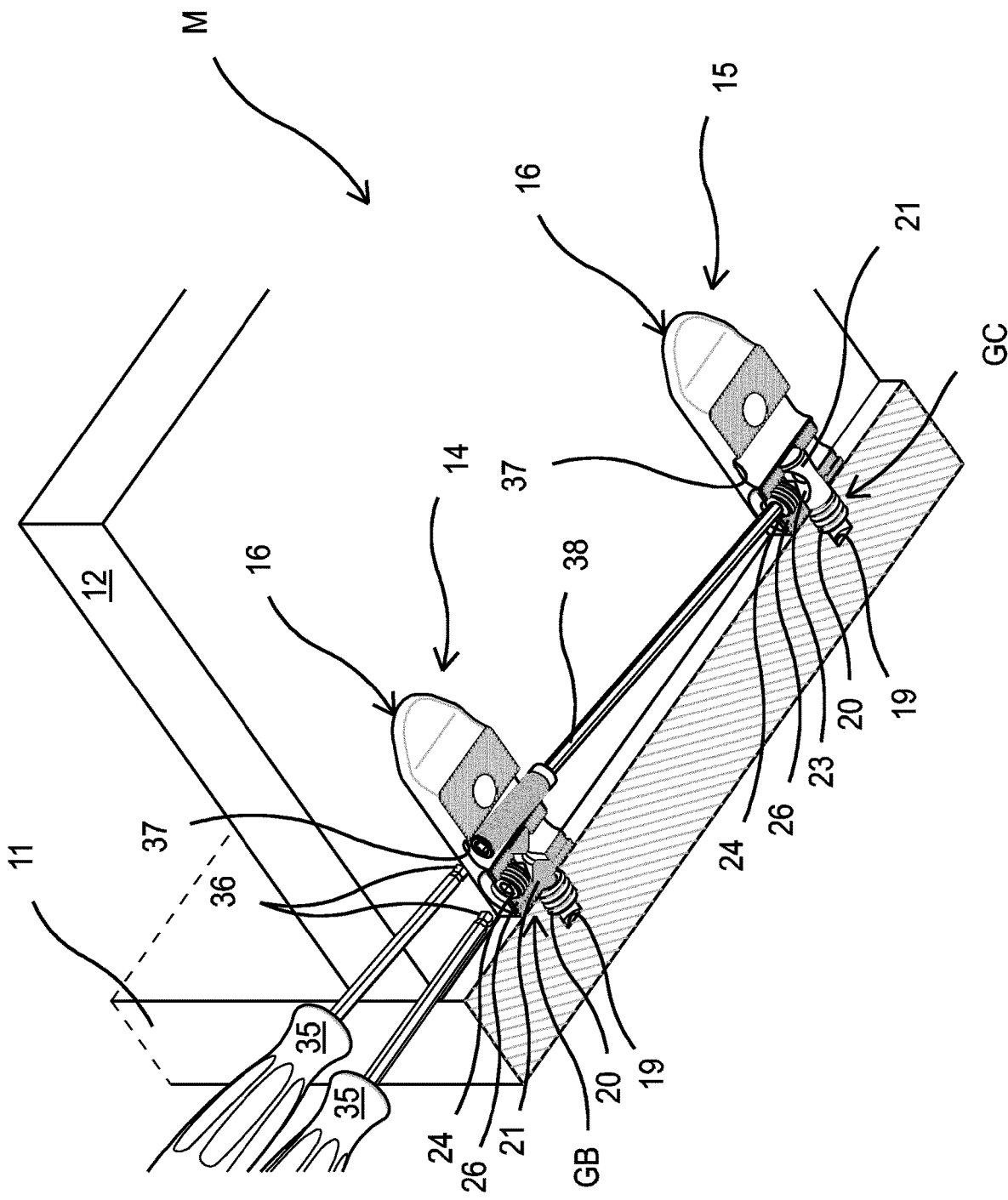
FIG. 4 is a perspective view of the joining system with a leveller of FIG. 1 with the front and rear supporting feet that are sectioned in correspondence with the manoeuvring parts.
Figure 5:
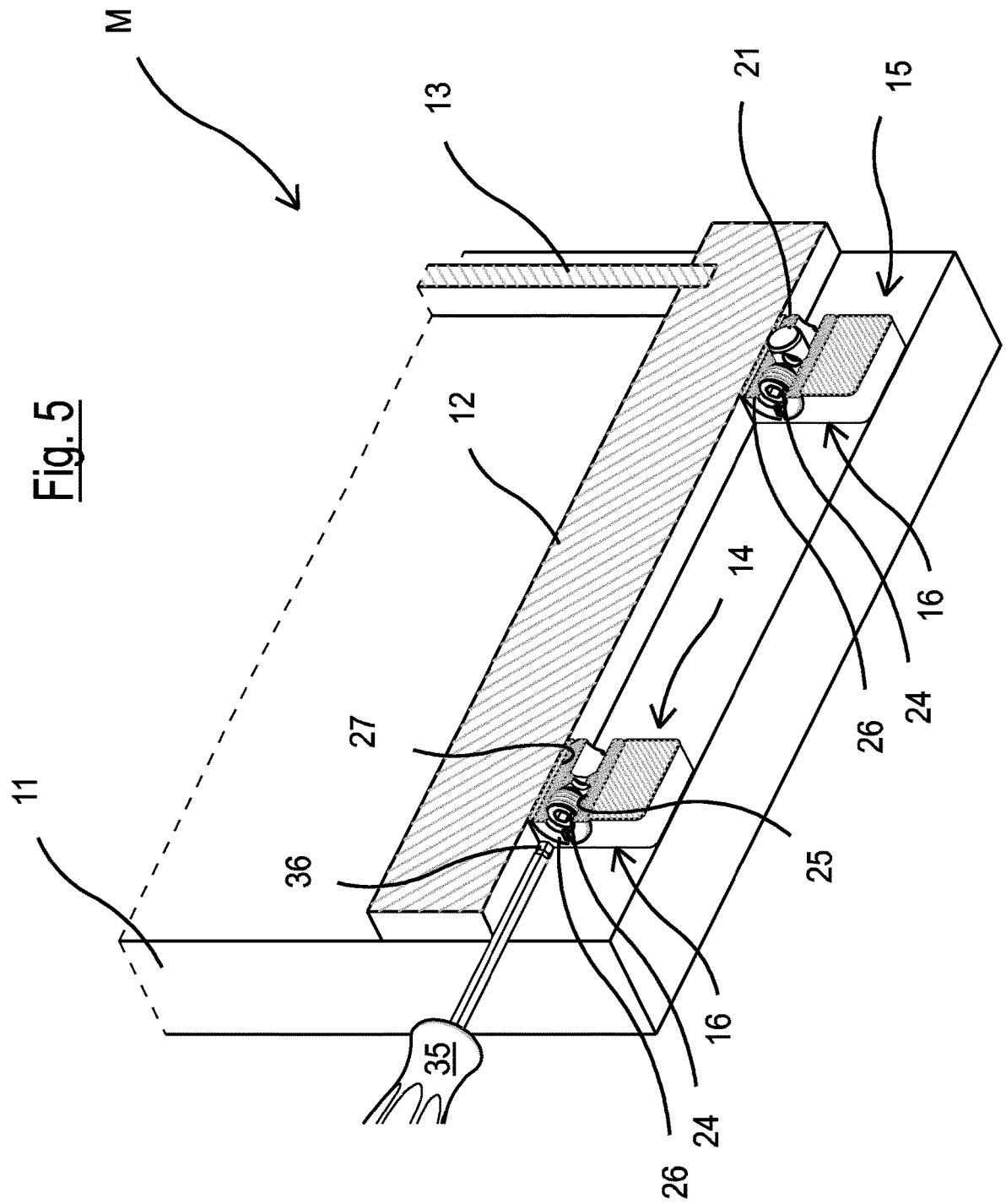
FIGS. 5 and 6 are perspectives from a different angulation of the joining system with a leveller of FIG. 1 sectioned in successive vertical planes in correspondence with the front and rear supporting feet.
Figure 6:
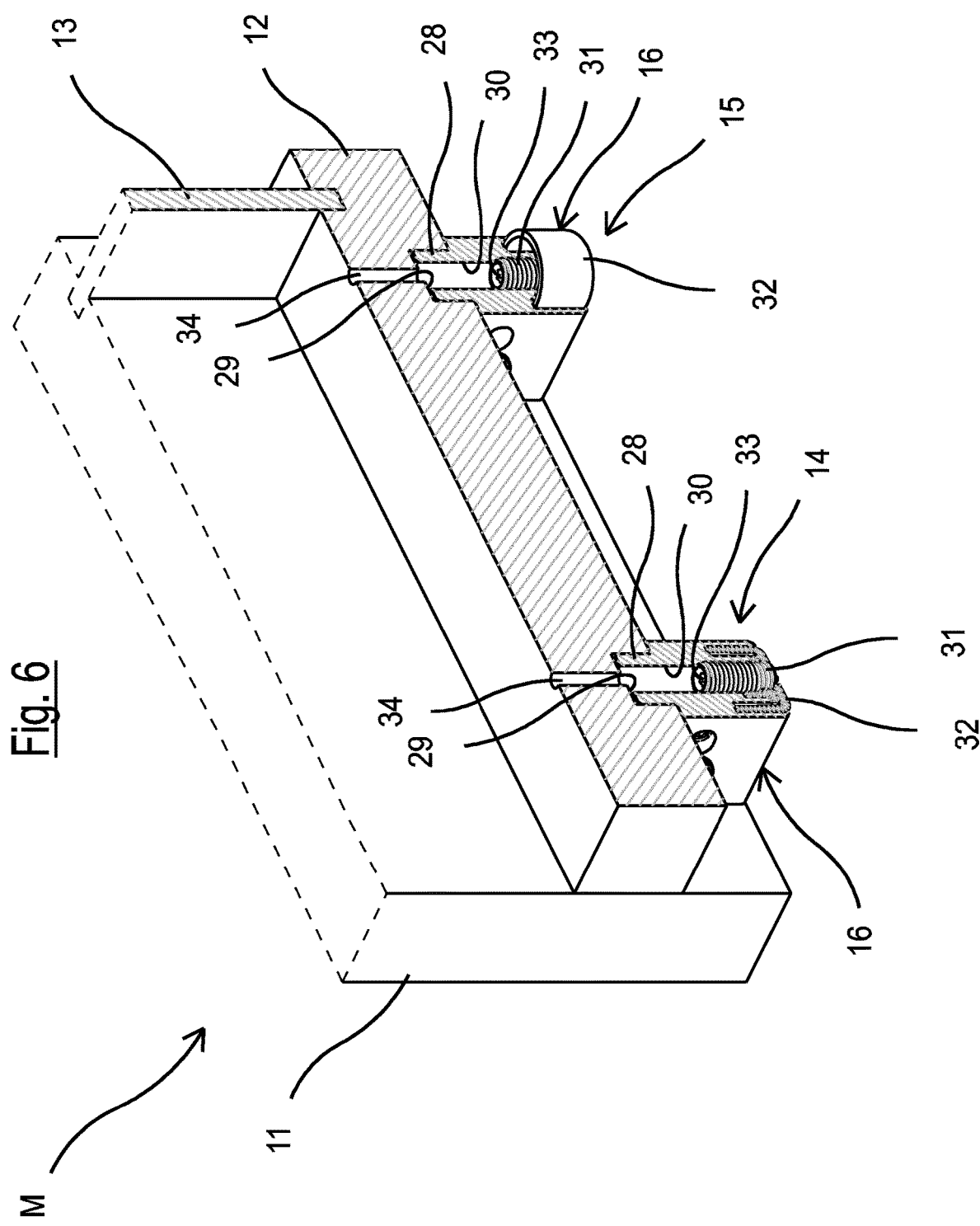
Figure 7:
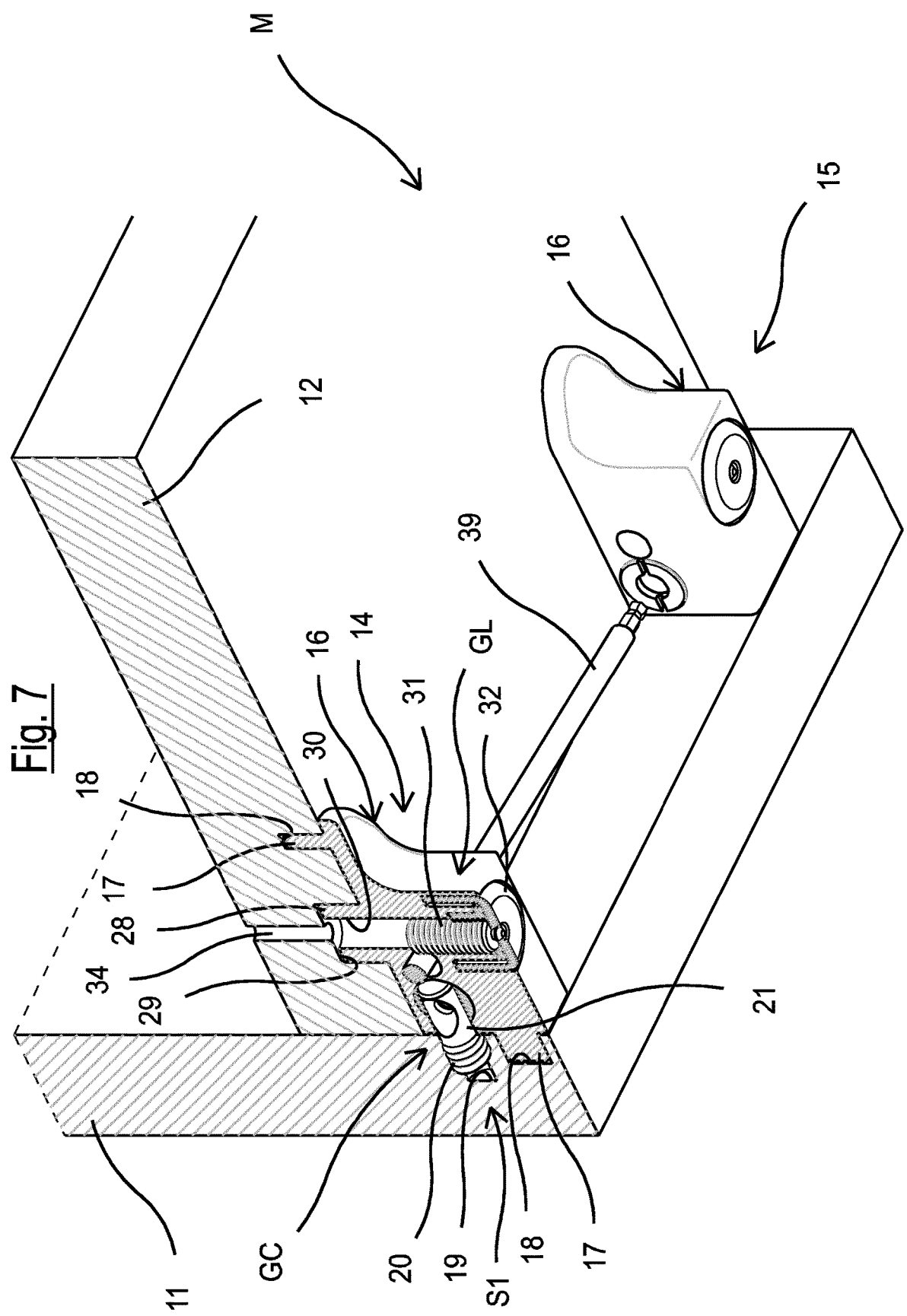
FIG. 7 is a perspective view with cross-sectioned parts that illustrate a second example of a joining system with a leveller for parts of furniture and furnishing items produced according to the present invention positioned for joining a shoulder and a bottom or base of a piece of furniture with a rear foot that can be actuated with a long-stemmed screwdriver.
Figure 10:
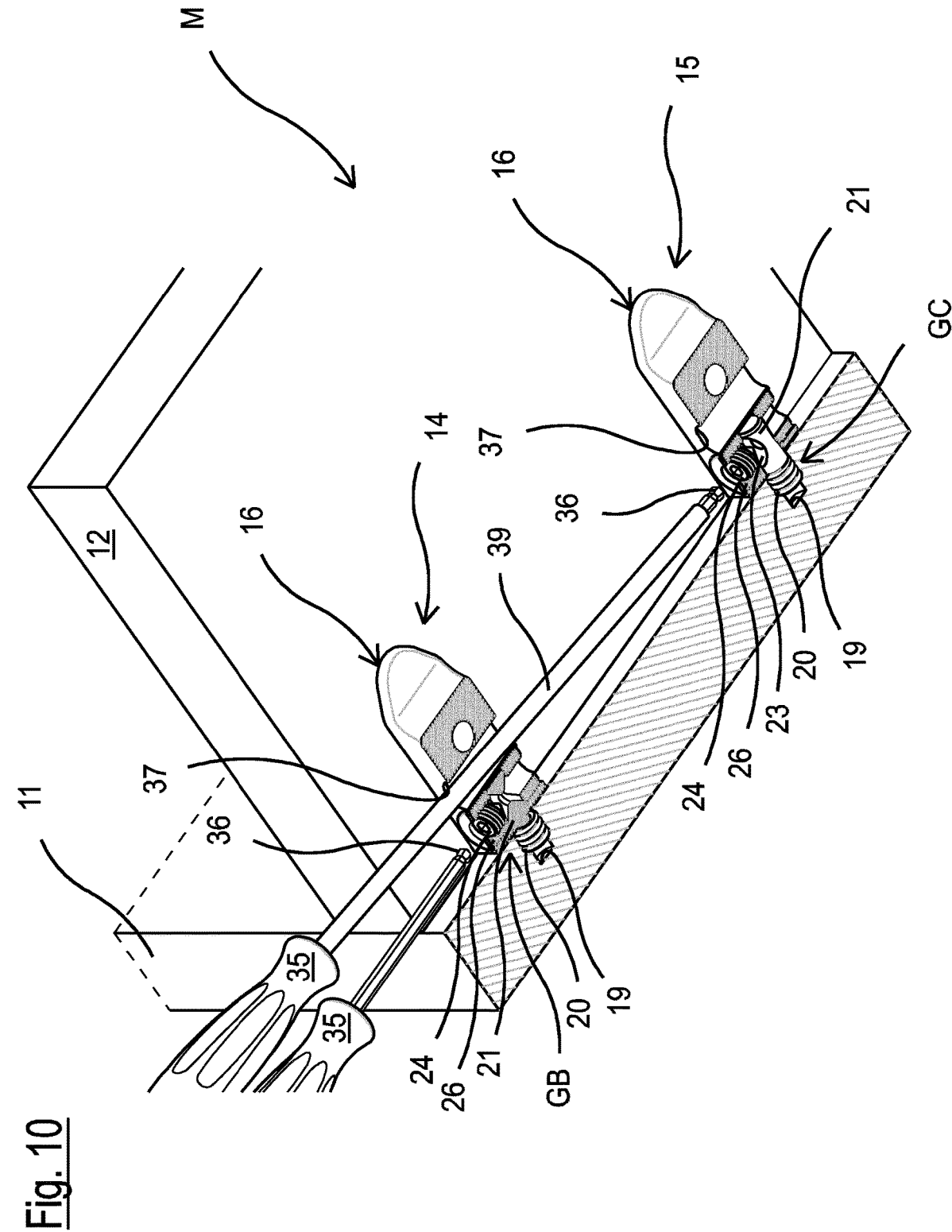
FIG. 10 is a perspective view of the joining system with a leveller of FIG. 7 with the front and rear supporting feet that are sectioned in correspondence with the manoeuvring parts.
Figure 11:
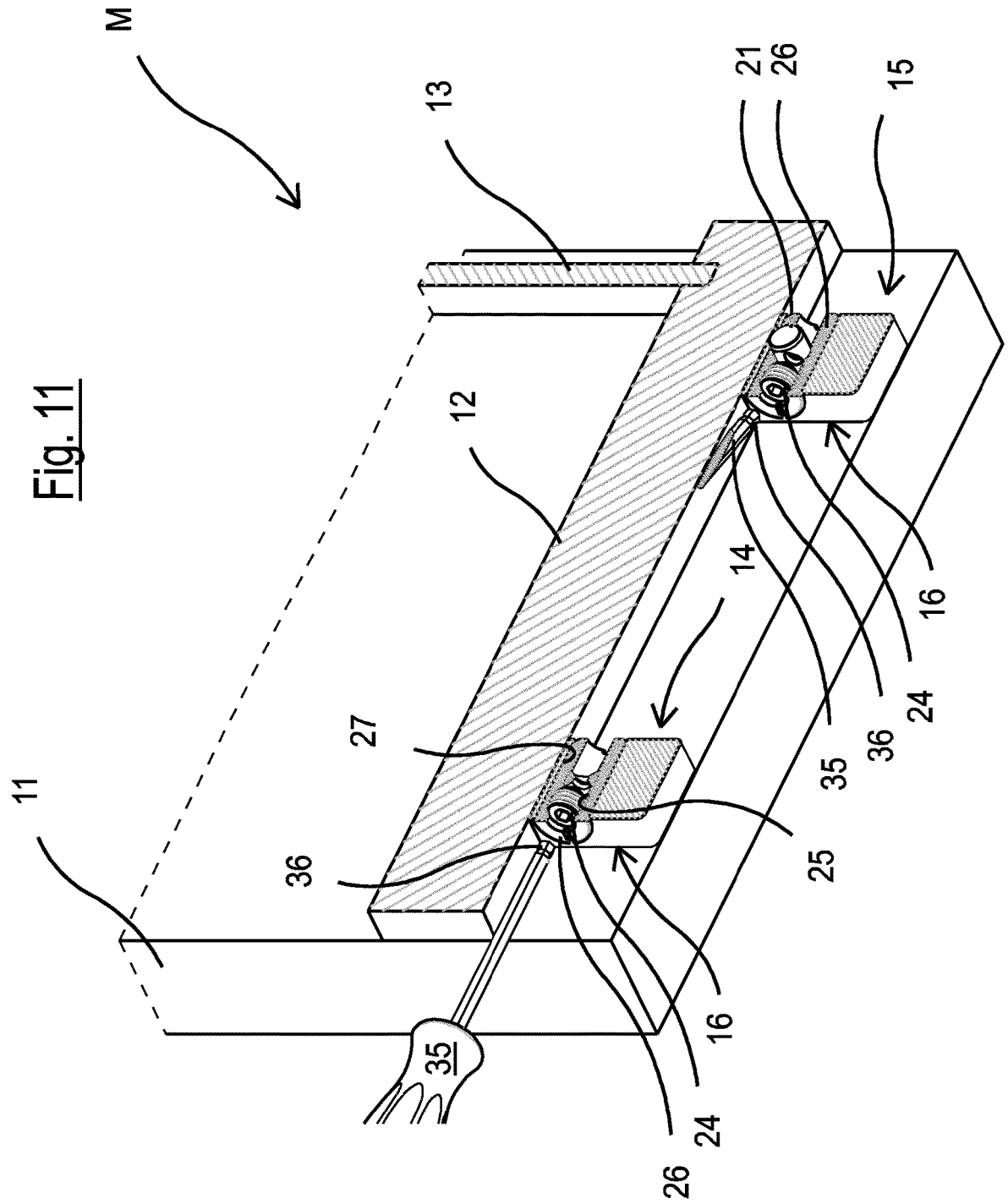
FIGS. 11 and 12 are perspectives from a different angulation of the joining system with a leveller of FIG. 7 sectioned in successive vertical planes in correspondence with the front and rear supporting feet.
Figure 12:
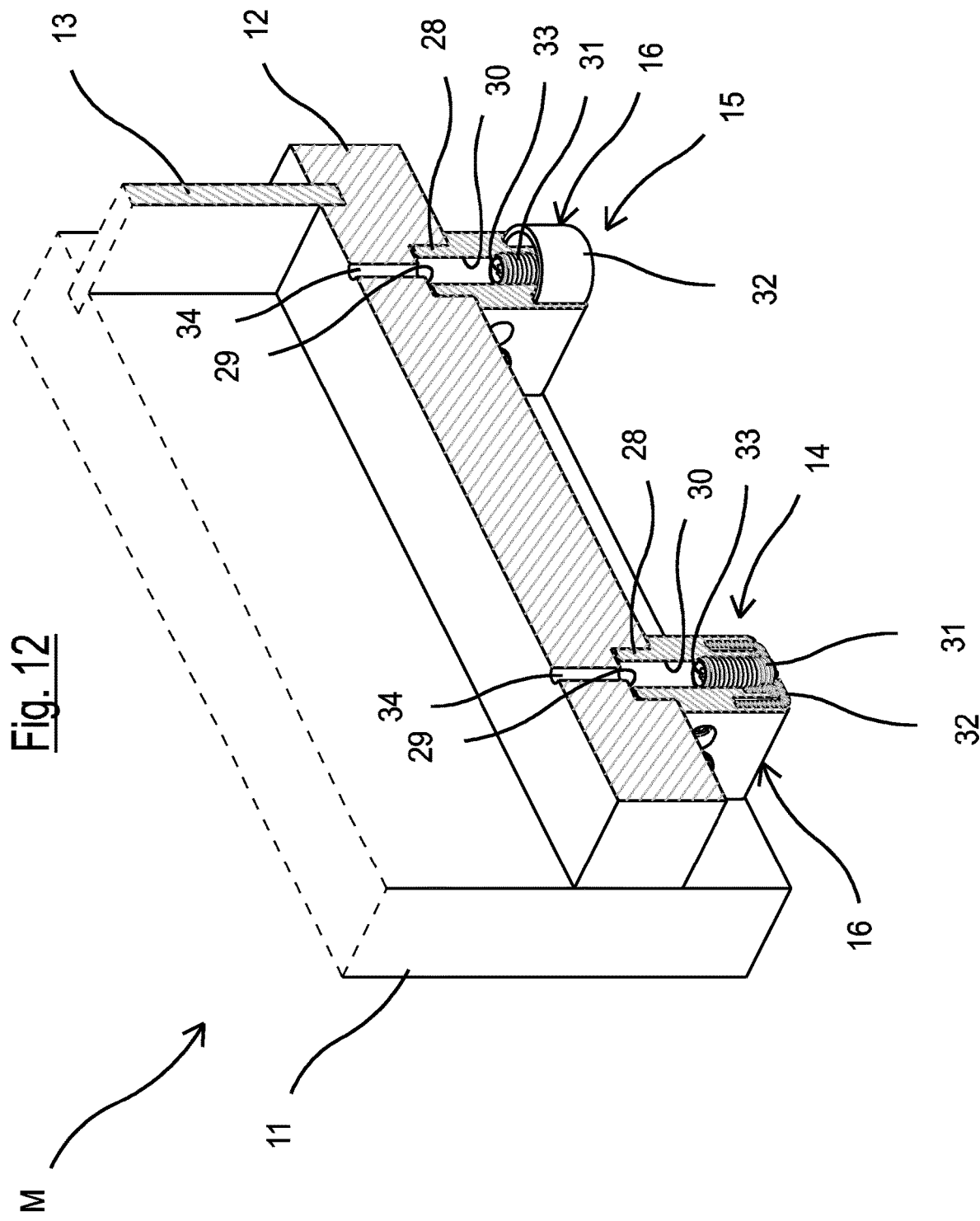

FIGS. 4 and 5, on the other hand, show, in addition to the structure of the system of the invention, how the actuation of the blocking group GB is effected in the front-foot unit 14 and rear-foot unit 15 in the space between the bottom 12 and floor P.

A shaped tool 35 provided, for example, with a hexagonal head 36, is suitable for being inserted inside a complementary seat of the grub screw 24, which 24, when rotating, is engaged with the housing 23 of the pin 21, blocking it. This takes place for the front-foot unit 14.

A further hole 37, adjacent to the horizontal hole 27, is provided in the body 16 of the front-foot unit 14, said hole 37 housing an end of a transmission rod 38 which is inserted at the other end in the seat of the grub screw 24 of the rear-foot unit 15.

As already mentioned, as the rear unit also provides a blocking group GB with a grub screw 24 like the other, by inerting the tip of a tool 35 in the seat of the transmission rod 38, the rear foot is also blocked between the shoulder 11 and bottom 12.

Once these blocking operations have been effected, as anticipated, the level of the corresponding foot of the furniture of the two front-foot 14 and rear-foot 15 units is adjusted, as needed. This is effected thanks to the presence of the small pass-through holes 34 formed in the bottom 12. Said holes 34 enable the thin tip of the tool 35 to be inserted from the upper end to the bottom, actuating and adjusting the threaded screw 31, and consequently the supporting element 32.

This joining system with a leveller for parts of furniture and furnishing items according to the invention allows only one extremely small hole 34 to be visible, once the whole system has been correctly assembled for connecting and blocking.

This small hole 34 is useful for levelling the furniture from above the bottom and does not even require a cap as it is minimally detectable by an observer.

The front-foot unit 14 and rear-foot unit 15 allow an easy assembly and fixing of the parts by front actuation with respect to the furniture through the space between the bottom or base and floor even when the space between the base and floor is extremely limited.

It should also be noted that this system according to the invention contains both the connection or joining group with relative blocking and also the leveller beneath the thickness of the bottom of the furniture.

Any disadvantage of the actuation is eliminated by being able to act in connection with the front of the furniture.

With respect to FIGS. 6 to 12, these show a second example of a joining system with a leveller produced according to the present invention configured for joining a shoulder and bottom of a piece of furniture.

In particular the same reference numbers will be used for the same elements, even if not specifically mentioned and described.

In particular, the figures show how, instead of the transmission rod 38, a long-stemmed screwdriver 39 is used for actuating the rear-foot unit 15.

It is in fact sufficient to insert the stem of the screwdriver 39 into the hole 37 of the front-foot unit 14 to intervene and also block the grub screw 24 of the rear-foot unit 15.

In view of the various embodiments previously illustrated and described, the features of the system of the present invention are thus reiterated hereunder.

This joining system with a leveller for parts of furniture and furnishing items enables there to be only one pair of small holes, once it has been correctly assembled for connecting shoulders and bottom of the furniture, thus giving the furniture a high aesthetic and functional characteristic.

As can be seen, this system is fixed to the bottom of the furniture and allows the actuation of the blocking groups from the front with respect to the furniture through the space between bottom or base and floor also when the space between the base and floor is extremely limited and narrow for an operator.

With the system of the present invention, both the connection or joining group with relative blocking and also the levelling group beneath the thickness of the front base or shelf or bottom of the furniture are advantageously compact and easy to actuate by any operator.

This provision also allows any additional element to be eliminated that serves to ensure the correct direction or orientation of the screwdriver that must be present in the known additional systems in the form of a guide or similar element fixed to the bottom of the furniture.

Instead of an actual butt joint, other joining devices can obviously also be used such as with an eccentric, worm screw, etc.

The objectives mentioned in the preamble of the description have therefore been achieved.

The protection scope of the present invention is defined by the enclosed claims.

The invention claimed is:

1. A joining system with a leveller joining a bottom and a shoulder of parts of furniture and furnishing items, comprising:
    at least one unit with a front foot; (14) and
    at least one unit with a rear foot (15),
    wherein each unit with a front and a rear foot (14, 15) comprises a joining unit comprising a connection group (GC), a blocking group (GB), and a levelling group (GL), all contained in a body (16) disposed under the bottom (12) and coupled to the shoulder (11) and adapted to be maneuvered with a tool,
    wherein said connection group (GC) and said blocking group (GB) of each joining unit of said front and rear foot (14, 15) are adapted to be actuated from a front with respect to a piece of furniture through a space between the bottom (12) and a floor (P),
    wherein said levelling group (GL) of each front and rear foot (14, 15) are adapted to be maneuvered with the tool (35) inserted in a hole (34) formed in said bottom (12) vertically towards the floor (P), and aligned with the front and the rear foot (14, 15), and
    wherein said body (16) has a sleeve extension (28) on its surface facing the bottom (12) of the piece of furniture (M), which is housed in a complementary hollow seat (29) in the bottom (12), wherein said sleeve extension (28) houses said levelling group (GL).

2. The joining system according to claim 1, wherein said units with a front foot (14) and a rear foot (15) are positioned beneath said bottom (12) between said shoulder (11) and said bottom (12), said front foot (14) providing a pass-through hole (37) adjacent to a second hole (27), which houses part of said joining system receiving an actuation tool (38, 39) of said unit with a rear foot (15).

3. The joining system according to claim 2, wherein said actuation tool is a transmission rod (38).

4. The joining system according to claim 2, wherein said actuation tool is a long-stemmed screwdriver (39).

5. The joining system according to claim 1, wherein said sleeve extension (28) has a pass-through hole (30), internally threaded and extending for the entire body (16), which receives a threaded screw (31) having a supporting element (32) at a lower end thereof, which collaborates with the floor (P).

6. The joining system according to claim 1, wherein said connection group (GC) of each of the front foot (14) and rear foot (15) has a pin (21), integrally positioned in the shoulder (11), which is housed in a second hole (22) of said body (16).

7. The joining system according to claim 1, wherein said connection group (GC) comprises a blocking grub screw (24) screwed into a threaded hole (25) of a butt (26) housed in the body (16) of said front foot and said rear foot (14, 15), said threaded hole (25) being defined in a direction perpendicular to a second hole (22), which receives a pin (21) that extends from the shoulder (11), intersecting the shoulder.

8. A joining system with a leveller joining a bottom and a shoulder of parts of furniture and furnishing items, comprising:
    at least one unit with a front foot; (14) and
    at least one unit with a rear foot (15),
    wherein each unit with a front and a rear foot (14, 15) comprises a joining unit comprising a connection group (GC), a blocking group (GB), and a levelling group (GL), all contained in a body (16) disposed under the bottom (12) and coupled to the shoulder (11) and adapted to be maneuvered with a tool,
    wherein said connection group (GC) and said blocking group (GB) of each joining unit of said front and rear foot (14, 15) are adapted to be actuated from a front with respect to a piece of furniture through a space between the bottom (12) and a floor (P),
    wherein said levelling group (GL) of each front and rear foot (14, 15) are adapted to be maneuvered with the tool (35) be inserted in a hole (34) formed in said bottom (12) vertically towards the floor (P), and aligned with the front and the rear foot (14, 15), and
    wherein said body (16) includes at least one pair of plugs (17), one of said plugs being positioned in a second hole (18) in said shoulder (11) and another one of said plugs being positioned in a third hole (18) in said bottom (12).

9. The joining system according to claim 8, wherein said units with a front foot (14) and a rear foot (15) are positioned beneath said bottom (12) between said shoulder (11) and said bottom (12), said front foot (14) providing a pass-through hole (37) adjacent to a second hole (27), which houses part of said joining system receiving an actuation tool (38, 39) of said unit with a rear foot (15).

10. The joining system according to claim 9, wherein said actuation tool is a transmission rod (38).

11. The joining system according to claim 9, wherein said actuation tool is a long-stemmed screwdriver (39).

12. The joining system according to claim 8, wherein said connection group (GC) of each of the front foot (14) and rear foot (15) has a pin (21), integrally positioned in the shoulder (11), which is housed in a second hole (22) of said body (16).

\* \* \* \* \*